US008719818B2

(12) United States Patent
Chen et al.

(10) Patent No.: US 8,719,818 B2
(45) Date of Patent: May 6, 2014

(54) CLOUD-BASED TEST SYSTEM UTILIZING CLOUD SYSTEMS THAT INCLUDE CLOUD SERVERS TO SIMULATE VIRTUAL TEST MACHINES TO TEST AN ELECTRICAL DEVICE

(75) Inventors: Shiang-Jiun Chen, Yunlin County (TW); Shang-Lun Chiang, Taipei (TW); Han-Chao Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 440 days.

(21) Appl. No.: 13/278,259

(22) Filed: Oct. 21, 2011

(65) Prior Publication Data

US 2013/0019242 A1 Jan. 17, 2013

(30) Foreign Application Priority Data

Jul. 13, 2011 (TW) .............................. 100124798 A

(51) Int. Cl.
*G06F 9/455* (2006.01)
*G06F 9/46* (2006.01)
*G06F 11/00* (2006.01)

(52) U.S. Cl.
USPC .............................. 718/1; 718/104; 714/742

(58) Field of Classification Search
None
See application file for complete search history.

(56) References Cited

U.S. PATENT DOCUMENTS

| 8,122,282 | B2 * | 2/2012 | Betzler et al. .................. 714/4.1 |
| 8,607,203 | B1 * | 12/2013 | Mehra ........................... 717/131 |
| 2009/0300423 | A1 | 12/2009 | Ferris | |
| 2011/0010691 | A1 | 1/2011 | Lu et al. | |

* cited by examiner

*Primary Examiner* — Meng An
*Assistant Examiner* — Wissam Rashid
(74) *Attorney, Agent, or Firm* — McClure, Qualey & Rodack, LLP

(57) ABSTRACT

A cloud-based test system is disclosed. The cloud-based test system utilizes several cloud systems for testing. Each cloud system includes several cloud servers for providing a cloud resource to simulate several virtual test machines. The cloud-based test system includes several slave servers and a main server. Each slave server corresponds to one of the cloud systems for controlling the corresponding virtual test machines. The main server receives a test instruction, which is utilized to execute a target test item for a target electrical device, from a client, and generates a test environment condition corresponding to the test instruction. The main server determines the virtual test machines for executing the target test item and the at least one server to control the virtual test machines. The main server transmits the test instruction and the corresponding test environment condition to the server slave servers for testing.

16 Claims, 2 Drawing Sheets

CLOUD-BASED TEST SYSTEM UTILIZING CLOUD SYSTEMS THAT INCLUDE CLOUD SERVERS TO SIMULATE VIRTUAL TEST MACHINES TO TEST AN ELECTRICAL DEVICE

RELATED APPLICATIONS

This application claims priority to Taiwan Application Serial Number 100124798, filed Jul. 13, 2011, which is herein incorporated by reference.

BACKGROUND

1. Technical Field

The present invention relates to a test system, a test method and a computer-readable storage medium with a computer program to execute the method. More particularly, the present invention relates to a cloud-based test system and method, and a computer-readable storage medium with a computer program to execute the cloud-based test method.

2. Description of Related Art

With the rapid development in information technology, large numbers of different computer hardware devices and applications therefor have been developed. For computer-related hardware devices, systems or application software, many tests for determining normal operation and efficiency are required.

Computer hardware devices, such as display cards for driving monitors to display data, sound cards for driving computers to make sounds and network cards for connecting to networks, are manufactured with specific functions. If there is no display card, the monitor can not display images. Similarly, if there is no network card, the computer can not connect to the Internet. In general, when testing normal operation and efficiency of a network card, the network card may be initiated, after which a check may be performed to determine if the computer in which the network card is installed can connect to the Internet. The required time for connecting to the network may be further calculated. In some other scenarios, when performing stress tests with respect to a function of a computer hardware device, several physical computers may be utilized to simultaneously perform the tests with respect to test items through a network. Hence, it can be determined whether the test device can handle connections from several physical computers at the same time and execute the test items correctly.

In the prior art, such testing requires many physical computers, which involves high costs. To reduce the costs, the number of physical computers used for testing is limited. In some other scenarios, one physical computer may simulate several computers virtually to perform testing. However, such testing may lead to distorted test results since it has not been possible to accurately simulate actual conditions using prior art techniques.

SUMMARY

According to one embodiment of this invention, a cloud-based test system is provided to utilize several cloud systems for testing. Each of the cloud systems includes several cloud servers for providing a cloud resource to simulate several virtual test machines. The cloud-based test system includes several slave servers and a main server. Each of the slave servers corresponds to one of the cloud systems and builds connections with the cloud servers of the corresponding cloud system for controlling the corresponding virtual test machines. The main server communicates with the slave servers. The main server includes a storage unit and a processing unit which are electrically connected with each other. The storage unit stores a virtual test machine table which records information of which virtual test machines being controlled by each of the slave servers, a plurality of executable test items of each of the virtual test machines, and availability of each of the plurality of the executable test items. The processing unit includes an instruction receiving module, a determining module and an instruction transmitting module. The instruction receiving module is utilized for receiving a test instruction from a client, and generating a test environment condition corresponding to the test instruction. The test instruction is utilized to execute a target test item for a target electrical device. The determining module determines the virtual test machines for executing the target test item according to the test instruction and the virtual test machine table, and obtains information of at least one controlling slave server in the slave servers, which controls the determined virtual test machines for executing the target test item. The instruction transmitting module transmits the test instruction and the corresponding test environment condition to the at least one controlling slave server which controls the determined virtual test machines. Hence, the at least one controlling slave server which controls the determined virtual test machines controls the determined virtual test machines to execute the target test item for the target electrical device according to the corresponding test environment condition.

According to another embodiment of this invention, a cloud-based test method is provided by utilizing a cloud-based test system and several cloud systems for testing. Each of the cloud systems includes several cloud servers for providing a cloud resource to simulate several virtual test machines. The cloud-based test system includes several slave servers and a main server. Each of the slave servers corresponds to one of the cloud systems and builds connections with the cloud servers of the corresponding cloud system for controlling the virtual test machines thereof. The main server stores a virtual test machine table which records information of which virtual test machines being controlled by each of the slave servers, a plurality of executable test items of each of the virtual test machines, and availability of each of the plurality of the executable test items. In the cloud-based test method, the main server is utilized to receive a test instruction from a client and to generate a test environment condition corresponding to the test instruction. The test instruction is utilized to execute a target test item to a target electrical device. The main server is utilized to determine the virtual test machines for executing the target test item according to the test instruction and the virtual test machine table, and to obtain information of at least one controlling slave server in the slave servers, which controls the determined virtual test machines for executing the target test item. The main server is utilized to transmit the test instruction and the corresponding test environment condition to the at least one controlling slave server which controls the determined virtual test machines, such that the at least one controlling slave server which controls the determined virtual test machines controls the determined virtual test machines to execute the target test item for the target electrical device according to the corresponding test environment condition.

According to another embodiment of this invention, a computer-readable storage medium storing a computer program for executing the steps of the aforementioned cloud-based test method is provided. Steps of the method are as disclosed above.

The present invention can achieve many advantages. Virtual test machines simulated by several different cloud systems can perform testing for a target electrical device in the same way that several physical machines can. Since the virtual test machines are simulated by cloud resources of several cloud servers of different cloud systems, different cloud systems may provide different test items and different numbers of virtual test machines. Hence, during testing, the resources of the cloud-based test system can be more flexibly utilized, and the tests can be performed with more efficiency. In some embodiments, charges associated with different cloud systems may differ, and the security level thereof may be different. Hence, clients can choose suitable cloud systems for their tests according to their own needs.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
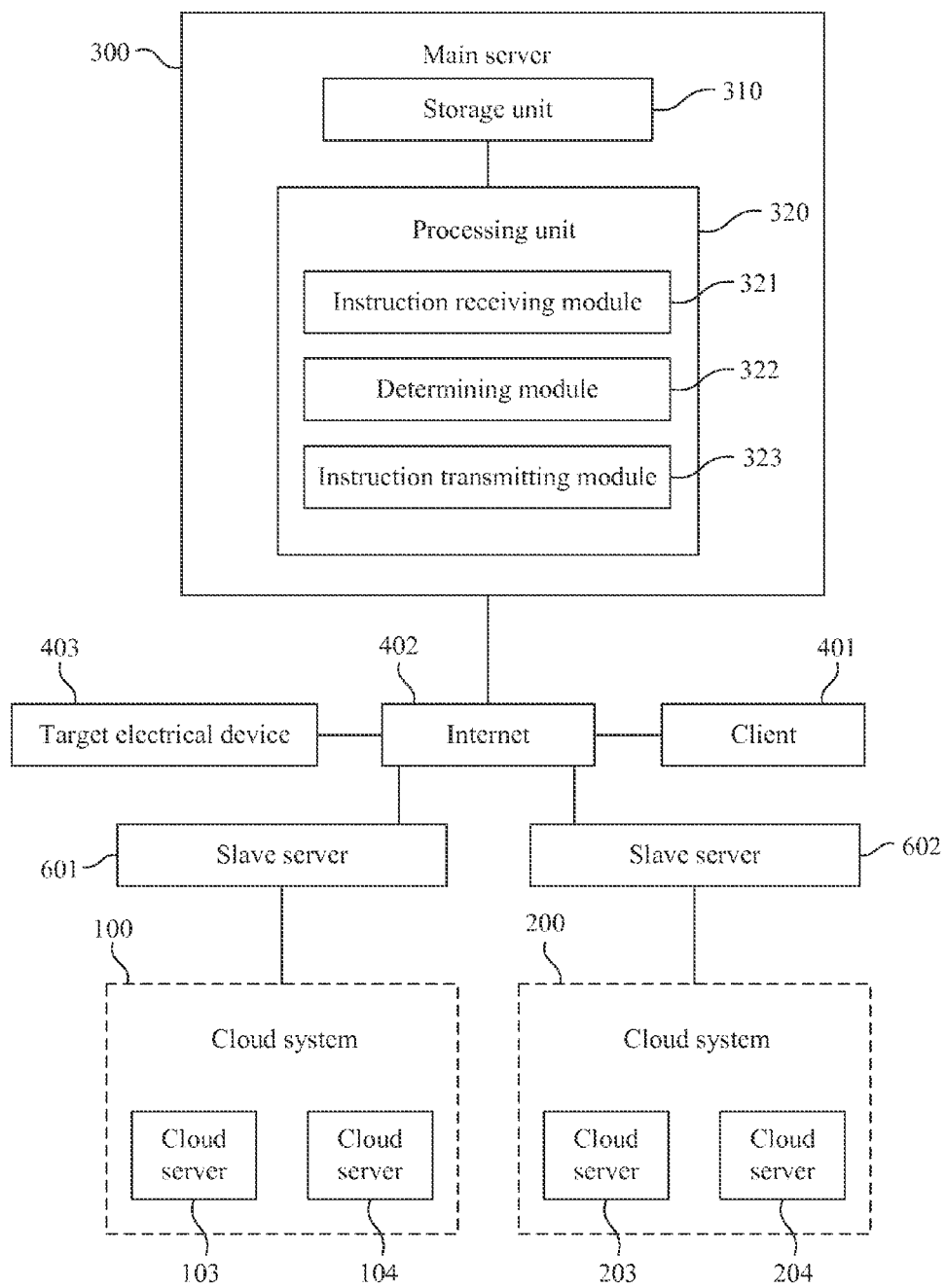
FIG. 1 is a block diagram of a cloud-based test system according to an embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a block diagram will be described that illustrates a cloud-based test system according to an embodiment of this invention. The cloud-based test system utilizes several cloud systems 100, 200 for testing. Each of the cloud systems 100, 200 includes several cloud servers for providing a cloud resource to simulate several virtual test machines for testing a target electrical device with a target test item. In the embodiment shown by way of example in FIG. 1, the cloud system 100 includes the cloud servers 103, 104 for providing a cloud resource to simulate several virtual test machines, and the cloud system 200 includes the cloud servers 203, 204 for providing another cloud resource to simulate several virtual test machines. Executable test items, which can be executed by the virtual test machines in the cloud systems 100 and 200 respectively, may be totally different, partially the same or all the same. In some embodiments, different numbers of cloud systems may be connected by the cloud-based test system of the present application, and the number of cloud servers deployed in the cloud systems may differ, which should not be limited in this disclosure.

The cloud-based test system includes several slave servers 601, 602 and a main server 300. The main server 300 communicates with the slave servers 601, 602 through a communication network, such as the Internet 402. The main server 300 may be deployed in one of the cloud systems 100 and 200. It also can be deployed in another cloud system, or an independent system not in the cloud system 100 and 200. The slave server 601 builds connections with the cloud servers 103, 104 of the corresponding cloud system 100 for controlling the corresponding virtual test machines simulated by the cloud system 100. The slave server 602 builds connections with the cloud servers 203, 204 of the corresponding cloud system 200 for controlling the corresponding virtual test machines simulated by the cloud system 200. The slave servers 601, 602 can be deployed respectively in the cloud systems 100 and 200. They also can be deployed in other cloud systems, or independent systems not in the cloud system 100 and 200.

The main server 300 includes a storage unit 310 and a processing unit 320, which are electrically connected with each other. The storage unit 310 stores a virtual test machine table, which records information of which virtual test machines being controlled by each of the slave servers, a plurality of executable test items of each of the virtual test machines, and availability of each of the plurality of the executable test items. Furthermore, the recorded information may further include deployed locations of the virtual test machines, efficiency information for the virtual test machines for executing test items, charge information of the cloud systems, security information of the cloud systems or any other needed information. The deployed locations of the virtual test machines may indicate the geographic deployed locations of the cloud systems or the cloud servers. The efficiency information for the virtual test machines to execute test items may be running time for executing test items, time intervals for waiting for response or any other efficiency information.

The processing unit 320 includes an instruction receiving module 321, a determining module 322 and an instruction transmitting module 323. The instruction receiving module 321 is utilized for receiving a test instruction from a client 401 through the Internet 402, and generating a test environment condition corresponding to the test instruction. The test instruction is utilized to execute a target test item for a target electrical device 403, such as a computer, a server, a mobile device, a PDA, or any other electrical device. The target test item may include a function test, a security test, a pressure test, a concurrent test or any other test. An operation interface can be used to edit or transmit test instructions to the instruction receiving module 321 for different tests. In one embodiment of this invention, the processing unit 320 may provide a web interface through the Internet 402, or specific applications or operation interfaces may be installed on the client 401 to provide the operation interface for editing and generating test instructions through the client 401. The generated test environment conditions may indicate the communication protocols utilized among the main server 300, the slave servers 601, 602 and the simulated virtual test machines. The communication protocols may include settings related to the data transmission format, the data transmission frequency, the data transmission method, the utilized system or any other data transmission setting. Furthermore, the test instruction may further include the deployed location of the cloud system/cloud server, which the client 401 requests for executing the test, and the information about the requested test efficiency. The deployed location of the cloud system/cloud server may refer to the geographic deployed location, the deployed country, the area, the deployed longitude and latitude or any other deployed location-related information.

The determining module 322 determines the virtual test machines for executing the target test item according to the test instruction and the virtual test machine table, and obtains information of at least one controlling slave server in the slave servers which controls the determined virtual test machines for executing the target test item. In one embodiment of this invention, the required number of the virtual test machines for executing the target test item for the client 401 can be obtained according to the test instruction. Information about the test items, which can be executed by the virtual test machines, can be obtained according to the virtual test machine table. The number of the virtual test machines available for executing the target test item can also be obtained according to the virtual test machine table. Subsequently, the determining module 322 utilizes the information mentioned above for determining (or selecting) the virtual test machines for executing the target test item. According to the relations among the slave servers 601, 602 and the cloud systems 100, 200 which simulate the virtual test machines, the information of the at least one controlling slave server which controls the determined (selected) virtual test machines for executing the target test item can be obtained.

The instruction transmitting module 323 transmits the test instruction and the corresponding test environment condition to the at least one controlling slave server which controls the determined virtual test machines. Hence, the at least one controlling slave server which controls the determined virtual test machines controls the determined virtual test machines to execute the target test item for the target electrical device 403 according to the corresponding test environment condition. Therefore, several virtual test machines simulated by different cloud systems can test the target electrical device 403 in the same way that physical machines do. In addition, since the virtual test machines are simulated utilizing the cloud resource provided by several cloud servers, limitations do not need to be placed on the number of the virtual test machines due to limited calculation resources or limited bandwidth for transmitting test packets. Hence, cloud resources can be utilized with more flexibility. In addition, in the present application, the virtual test machines are simulated utilizing different cloud servers through different network connections and environments. As a result, compared with the tests provided by several test equipment devices or systems with a single network connection for repeated tests, the present application can run tests in a manner that more closely resembles actual conditions.

Furthermore, when there is an insufficient number of the available virtual test machines for testing, the present application can further release the cloud resource of the cloud system, which can execute the target test item, for simulating more virtual test machines. Hence, the determining module 322 further determines if the number of the virtual test machines which can execute the target test item and are available is more than a required number of virtual test machines for executing the target test item. If the determination result is that the number of the virtual test machines which can execute the target test item and are available is not more than the required number (that means the number of the available virtual test machines for testing is not insufficient), the slave servers 601, 602 drive the connected cloud servers 103, 104, 203, 204 to release a releasable resource of their cloud resource, and utilize the released resource to add new virtual machines for the target test item. Hence, the cloud systems do not have to simulate numerous virtual test machines in advance, which can save resources of the cloud systems. If there is a need for more virtual test machines, the cloud systems, which can execute the target test item, can release their releasable resource for simulating more virtual test machines. The releasable resource may indicate the resource that can be interrupted, suspended, or stopped, and such resources may include CPUs, memories, storage mediums, etc. Hence, the cloud resources can be utilized with more flexibility.

In another embodiment of this invention, when the number of the available virtual test machine is insufficient for testing, the present application can further utilize the available cloud resource of the cloud system, which can execute the target test item, for simulating more virtual test machines. Such an available resource may include a CPU resource, memory spaces and storage medium spaces, which are not utilized. Hence, the determining module 322 may further determine if the number of the virtual test machines which can execute the target test item and are available is more than a required number of virtual test machines for executing the target test item. If the determination result is that the number of the virtual test machines which can execute the target test item and are available is not more than the required number (that means the number of the available virtual test machines for testing is not insufficient), the slave servers 601, 602 drive the connected cloud servers 103, 104, 203, 204 to utilize an available resource of the cloud resource to add several new virtual machines for executing the target test item. Therefore, more virtual test machines can be simulated utilizing the available resources of the cloud systems.

The main server 300 may further include a template database for storing several templates of preset test instructions. Hence, a user of the client 400 may select, edit, or amend the templates stored in the template database of the main server 300 for editing test instructions utilizing the preset test instructions. A user of the client 401 may edit test items of the templates according to his or her particular requirements. Furthermore, if there is no additional resource to add new virtual test machines or there is no sufficient number of virtual test machines for testing after being added, a user of the client 401 may be informed of the number of the available virtual test machines, or get a message when there will be enough available virtual test machines for executing the target test item. Hence, the user of the client 401 can determine if he/she wants to amend the test instruction or amend the time for executing the test instruction according to the provided information. In addition, the system may determine if there are sufficient cloud resources to add required virtual test machines for use as the factor for generating the aforementioned information according to the available or releasable cloud resources of the cloud systems, such as the available size of the memory or available calculation resource of the CPU.

In some embodiments, since the test may be executed through the Internet 402, the test result, the required time for executing the test, the costs associated with the test or security may be affected by the deployed location of the target test device 403. In addition, the user of the client 401 may take the security or costs of the cloud systems deployed at different locations into consideration. Hence, the determining module 322 may further take installed locations of the cloud servers 103, 104, 203, 204 into consideration to determine (select) the virtual test machines for executing the target test item. Information for the installed location(s) of the cloud servers 103, 104, 203, 204 may be stored in advance or obtained according to their IP addresses. In some embodiments, whether there is a location pre-determined in the test instruction by the client may also be taken into consideration for determining (selecting) the virtual test machines for executing the target test item.

Moreover, the processing unit 320 may further include a test-result processing module. The test-result processing module obtains a test result of the target test item, which is executed by the determined (selected) virtual test machines for the target electrical device 403, and transmits the test result to the main server 300 for presenting to the client 401.

In some embodiments, the test-result processing module may store the obtained test result into the storage unit 310 and then transmit the same to the client 401 for display. In some embodiments, if the test is provided utilizing the virtual test machines controlled by several different slave servers, the test-result processing module may collect the test result from the selected slave servers and either organize or generate a result report of the same for subsequent transmission to the client 401 for display. In another embodiment, the at least one controlling slave server which controls the determined (selected) virtual test machines for executing the target test item may gather the test result and transmit the same to the test-result processing module of the main server 300.

In addition, the processing unit 320 of the main server 300 may communicate with the slave servers 601, 602 to obtain the information of the controlled virtual test machines to record and update the virtual test machine table stored in the storage unit 310. In one embodiment of this invention, the processing unit 320 may update the virtual test machine table periodically. In another embodiment of this invention, the processing unit 320 of the main server may update the virtual test machine table if the virtual test machines controlled by the slave servers change. In still another embodiment of this invention, the processing unit 320 of the main server 300 may perform the update when the test instruction is received from the client 401 to obtain the up-to-date information of the virtual test machines controlled by the cloud systems 100, 200. In some embodiments, the processing unit 320 periodically communicates with the slave servers 601, 602 to obtain the information about availability of their virtual test machines, or the slave servers 601, 602 may periodically transmit the information about the availability of their virtual test machines.

In some embodiments, the storage unit 310 of the main server 300 may further store test history information of the cloud-based test system, such as test instructions received from different clients, required number of virtual test machines for different clients, requested location for virtual test machines, required time for executing tests or test results, etc. The determining module 322 further calculates a total required number of virtual test machines of the cloud-based test system for the slave servers according to the test history information. There may be several ways to calculate the total required number of virtual test machines. For example, according to the test history information of all clients, the required number of the virtual test machines for each of the clients may be estimated and summarized to calculate the total required number of the virtual test machines. In another embodiment of this invention, using the test history information of all clients, a maximal required number of virtual test machines may be obtained and taken as the total required number. In some embodiments, an average required number of virtual test machines can be obtained and taken as the total required number.

In another embodiment, the cloud-based test system of the present application may estimate and configure the required number of the virtual test machines to make the total required number of virtual test machines equal to the virtual test machines controlled by the slave servers of the cloud-based test system, which can eliminate the response time. In some embodiments, the determining module 322 may maintain the total number of the virtual test machines controlled by the slave servers and the available number of the virtual test machines. When a client makes a request for testing, a specific number of the virtual test machines may be assigned and the assigned virtual test machines may be controlled by several different slave servers. For example, among the assigned virtual test machines, there may be thirty virtual test machines controlled by the slave server 601 and twenty virtual test machines controlled by the slave server 602. In other words, when the test is executed, fifty virtual test machines may be required, and the determining module 322 may inform the corresponding slave servers 601, 602 to respectively provide thirty and twenty virtual test machines capable of executing the test. After the test is finished, fifty virtual test machines may be released, and the determining module 322 may instruct the slave servers 601, 602 to respectively delete thirty and twenty virtual test machines. Hence, a specific number of the virtual test machines may be kept. When the slave servers 601, 602 provide or delete virtual test machines, the processing unit 320 may be informed to update the virtual test machine table and store the updated virtual test machine table in the storage unit 310.

Figure 2:
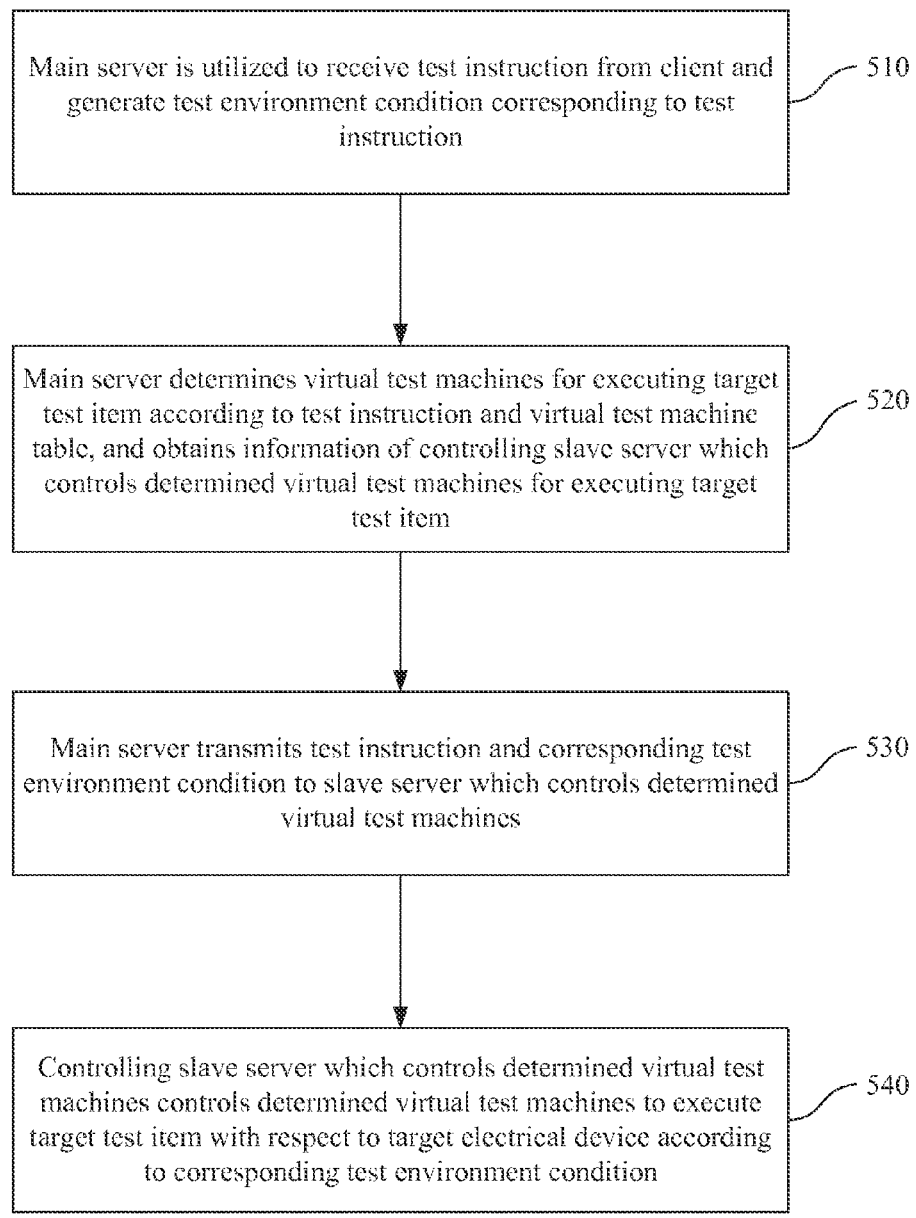
FIG. 2 is a flow diagram of a cloud-based test method according to one embodiment of this invention.

Referring to FIG. 2, a flow diagram will be described that illustrates a cloud-based test method according to one embodiment of this invention. In the cloud-based test method, cloud resources provided by cloud servers are utilized to simulate several virtual test machines to execute a target test item for a target electrical device. The cloud-based test method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

Reference is made to both FIG. 1 and FIG. 2. The cloud-based test method utilizes a cloud-based test system and several cloud systems 100, 200 for testing. The cloud system 100 includes several cloud servers 103, 104 for providing a cloud resource to simulate several virtual test machines. The cloud system 200 also includes several cloud servers 203, 204 for providing a cloud resource to simulate several virtual test machines. Executable test items, which can be executed by the virtual test machines simulated in the cloud systems 100 and 200, may be totally different, partially the same or all the same.

The cloud-based test system includes several slave servers 601, 602 and a main server 300. Each of the slave servers 601, 602 corresponds to one of the cloud systems 100, 200. For example, the slave server 601 corresponds to the cloud system 100, and the slave server 602 corresponds to the cloud system 200. Each of the slave servers 601, 602 builds connections with the cloud servers of the corresponding cloud system for controlling the virtual test machines thereof. The main server 300 stores a virtual test machine table, which records information with respect to which virtual test machines are controlled by. The information includes executable test items, which can be executed by the virtual test machines, and availability of the executable test items.

The routine 500 of the cloud-based test method may begin at operation 510, where the main server 300 is utilized to receive a test instruction from a client and to generate a test environment condition corresponding to the test instruction. The test instruction is utilized to execute a target test item for a target electrical device 403. The generated test environment condition may indicate the communication protocols utilized between the main server 300, the slave servers 601, 602 and the simulated virtual test machines. The communication protocol may include a setting related to the data transmission format, the data transmission frequency, the data transmission method, the utilized system or any other data transmission setting.

The routine 500 continues to operation 520, where the main server 300 determines the virtual test machines for executing the target test item according to the test instruction and the virtual test machine table, and obtains information of at least one controlling slave server in the slave servers which controls the determined virtual test machines for executing the target test item.

From operation 520, the routine 500 continues to operation 530, where the main server 300 transmits the test instruction and the corresponding test environment condition to the at least one controlling slave server which controls the determined virtual test machines.

The routine 500 then continues to operation 540, where the at least one controlling slave server which controls the determined virtual test machines controls the determined virtual test machines to execute the target test item with respect to the target electrical device according to the corresponding test environment condition.

In one embodiment of this invention, when the number of the available virtual test machines is insufficient for testing, the cloud resource of the cloud system, which can execute the target test item, can be released for simulating more virtual test machines at operation 520. Hence, the main server 300 may be utilized at operation 520 to determine if the number of the virtual test machines which can execute the target test item and are available is more than a required number of virtual test machines for executing the target test item. If the number of the virtual test machines which can execute the target test item and is not more than the required number, the slave servers 601, 602 drive the connected cloud servers to release a releasable resource of their cloud resource, and utilize the released resource to add several new virtual machines for testing.

In another embodiment of this invention, when the number of the available virtual test machines is insufficient for testing, the main server 300 may be used at operation 520 to determine if the number of the virtual test machines which can execute the target test item and are available is more than required number of virtual test machines for executing the target test item. If the number of the virtual test machines is not more than the required number, the slave servers 601, 602 drive the connected cloud servers to utilize an available resource of the cloud resource to add several new virtual machines for testing.

In some embodiments, since the test may be executed through the Internet 402, the test result, the required time for executing the test, the costs associated with the test or security may be affected by the deployed location of the target test device 403. Hence, the routine 500 of the cloud-based test method may further include the main server 300 taking installed locations of the cloud servers 103, 104, 203, 204 into consideration for determining the virtual test machines for executing the target test item. The installed location of the cloud servers 103, 104, 203, 204 may be stored in advance or obtained using their IP addresses.

In addition, after operation 540, the main server 300 may obtain a test result of the target test item, which is executed by the determined (selected) virtual test machines for the target electrical device 403, and may transmit the test result to the main server 300 for presenting to the client 401.

The routine 500 of the cloud-based test method may further include the main server 300 communicating with the slave servers 601, 602 for obtaining the information of the virtual test machines controlled by the slave servers 610, 602, and then recording and updating the information of the virtual test machines in the virtual test machine table.

The routine 500 of the cloud-based test method may further include the main server 300 further storing test history information of the client 401 accessing the cloud-based test system. Subsequently, the main server 300 further estimates and calculates a total required number of virtual test machines requested by the client 401 to be used as the activated virtual machine number and further determines (selects) the virtual test machines to execute the target test item.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A cloud-based test system utilizing a plurality of cloud systems for testing, wherein, each of the cloud systems comprises one or more cloud servers to simulate one or more virtual test machines, and the cloud-based test system comprises:
   (a) a plurality of slave servers, wherein each of the slave servers corresponds to one of the cloud systems and builds connections with the one or more cloud servers of the corresponding cloud system for controlling the one or more virtual test machines; and
   (b) a main server communicating with the slave servers, wherein the main server comprises:
      (i) a storage unit for storing a virtual test machine table, wherein the virtual test machine table records information of which of the slave servers control which of the virtual test machines, a plurality of executable test items, information of which executable test items each of the virtual test machines can execute, and information of an availability of each of the plurality of the executable test items; and
      (ii) a processing unit electrically connected to the storage unit, wherein the processing unit comprises:
         1) an instruction receiving module for receiving a test instruction from a client, and generating a test environment condition corresponding to the test instruction, wherein a target test item for a target electrical device is determined according to the test instruction, wherein the target test item is one of the plurality of executable test items;
         2) a determining module for determining one or more virtual test machines for executing the target test item according to the test instruction and the virtual test machine table, and obtaining information of at least one controlling slave server amongst the plurality of slave servers, which controls the determined one or more virtual test machines for executing the target test item; and
         3) an instruction transmitting module for transmitting the test instruction and the corresponding test environment condition to the at least one controlling slave server which controls the determined virtual test machines, such that the at least one controlling slave server which controls the determined virtual test machines controls the determined virtual test machines to execute the target test item for the target electrical device according to the corresponding test environment condition.

2. The cloud-based test system of claim 1, wherein the determining module further determines if a number of the virtual test machines which can execute the target test item and are available is more than a required number of virtual test machines for executing the target test item, and
if the number of the virtual test machines which can execute the target test item and are available is not more than the required number, the slave servers drive the connected cloud servers to release a releasable resource of their cloud resource, and utilize the released resource to add a plurality of new virtual machines for testing.

3. The cloud-based test system of claim 1, wherein the determining module further determines if a number of the virtual test machines which can execute the target test item and are available is more than a required number of virtual test machines for executing the target test item, and
if the number of the virtual test machines which can execute the target test item and are available is not more than the required number, the slave servers drive the connected cloud servers to utilize an available resource of the cloud resource to add a plurality of new virtual machines for testing.

4. The cloud-based test system of claim 1, wherein the main server further comprises:
a template database for storing a plurality of templates of preset test instructions.

5. The cloud-based test system of claim 1, wherein the determining module further takes installed locations of the cloud servers into consideration for determining the virtual test machines for executing the target test item.

6. The cloud-based test system of claim 1, wherein the processing unit further comprises:
a test-result processing module for obtaining a test result of the target test item, which is executed by the determined virtual test machines for the target electrical device, and transmitting the test result to the main server for presenting to the client.

7. The cloud-based test system of claim 1, wherein the main server records and updates the information of the virtual test machines recorded in the virtual test machine table by communicating with the slave servers for obtaining the information of the virtual test machines.

8. The cloud-based test system of claim 1, wherein the storage unit further stores test history information of the cloud-based test system, and the determining module further calculates a required number of virtual test machines of the cloud-based test system for the slave servers according to the test history information.

9. A cloud-based test method performed by utilizing a cloud-based test system and a plurality of cloud systems for testing, wherein, each of the cloud systems comprises one or more cloud servers to simulate one or more virtual test machines, the cloud-based test system comprises:
a plurality of slave servers and a main server, each of the slave servers corresponds to one of the cloud systems and builds connections with the one or more cloud servers of the corresponding cloud system for controlling the one or more virtual test machines, wherein the main server communicates with the slave servers and the main server stores a virtual test machine table, the virtual test machine table records information of which of the slave servers control which of the virtual test machines, a plurality of executable test items, information of which executable test items each of the virtual test machines can execute, and information of an availability of each of the plurality of the executable test items, and the cloud-based test method further comprises:
utilizing the main server to receive a test instruction from a client and to generate a test environment condition corresponding to the test instruction, wherein a target test item for a target electrical device is determined according to the test instruction, wherein the target test item is one of the plurality of executable test items;
utilizing the main server to determine the one or more virtual test machines for executing the target test item according to the test instruction and the virtual test machine table, and to obtain information of at least one controlling slave server amongst the plurality of slave servers which controls the determined one or more virtual test machines for executing the target test item; and
utilizing the main server to transmit the test instruction and the corresponding test environment condition to the at least one controlling slave server which controls the determined virtual test machines, such that the at least one controlling slave server which controls the determined virtual test machines controls the determined virtual test machines to execute the target test item for the target electrical device according to the corresponding test environment condition.

10. The cloud-based test method of claim 9 further comprising:
utilizing the main server to determine if a number of the virtual test machines which can execute the target test item and are available is more than a required number of virtual test machines for executing the target test item, and
if the number of the virtual test machines which can execute the target test item and are available is not more than the required number, utilizing the slave servers to drive the connected cloud servers to release a releasable resource of their cloud resource, and utilize the released resource to add a plurality of new virtual machines for testing.

11. The cloud-based test method of claim 9 further comprising:
utilizing the main server to determine if a number of the virtual test machines which can execute the target test item and are available is more than a required number of virtual test machines for executing the target test item, and,
if the number of the virtual test machines which can execute the target test item and are available is not more than the required number, utilizing the slave servers to drive the connected cloud servers to utilize an available resource of the cloud resource to add a plurality of new virtual machines for testing.

12. The cloud-based test method of claim 9 further comprising:
taking installed locations of the cloud servers into consideration for determining the virtual test machines for executing the target test item.

13. The cloud-based test method of claim 9 further comprising:
utilizing the main server to obtain a test result of the target test item, which is executed by the determined virtual test machines for the target electrical device, and transmit the test result to the main server for presenting to the client.

14. The cloud-based test method of claim 9, wherein the main server records and updates the information of the virtual test machines recorded in the virtual test machine table by communicating with the slave servers for obtaining the information of the virtual test machines.

15. The cloud-based test method of claim 9, wherein the main server further stores test history information of the cloud-based test system, and the main server further calculates a total required number of virtual test machines of the cloud-based test system for the slave servers according to the test history information.

16. A non-transitory computer-readable storage medium with a computer program to execute a cloud-based test method, wherein, the cloud-based test method utilizes a cloud-based test system and a plurality of cloud systems for testing, each of the cloud systems comprises one or more cloud servers to simulate one or more virtual test machines, the cloud-based test system comprises a plurality of slave servers and a main server, each of the slave servers corresponds to one of the cloud systems and builds connections with the one or more cloud servers of the corresponding cloud system for controlling the one or more virtual test machines, wherein the main server communicates with the slave servers and the main server stores a virtual test machine table, the virtual test machine table records information of which of the slave servers control which of the virtual test machines, a plurality of executable test items, information of which executable test items each of the virtual test machines can execute, and information of an availability of each of the plurality of the executable test items, and the cloud-based test method further comprises:

utilizing the main server to receive a test instruction from a client and to generate a test environment condition corresponding to the test instruction, wherein a target test item for a target electrical device is determined according to the test instruction, wherein the target test item is one of the plurality of executable test items;

utilizing the main server to determine the one or more virtual test machines for executing the target test item according to the test instruction and the virtual test machine table, and to obtain information of at least one controlling slave server amongst the plurality of slave servers which controls the determined one or more virtual test machines for executing the target test item; and utilizing the main server to transmit the test instruction and the corresponding test environment condition to the at least one controlling slave server which controls the determined virtual test machines, such that the at least one controlling slave server which controls the determined virtual test machines controls the determined virtual test machines to execute the target test item for the target electrical device according to the corresponding test environment condition.

* * * * *